(12) United States Patent
Besler et al.

(10) Patent No.: US 9,079,482 B2
(45) Date of Patent: Jul. 14, 2015

(54) POWERED VEHICLE WITH AN INDEPENDENT AND INTERCHANGEABLE POWERTRAIN ASSEMBLY

(75) Inventors: Mark J. Besler, Dubuque, IA (US); Carolyn Lambka Drum, Dubuque, IA (US); Jeffrey S. Turner, Coffeyville, KS (US); Kinte Allen, Dubuque, IA (US); Mark Cherney, Potosi, WI (US); Michael J. Ackerman, Peosta, IA (US)

(73) Assignee: Deere & Company, Moline, IL (US)

( * ) Notice: Subject to any disclaimer, the term of this patent is extended or adjusted under 35 U.S.C. 154(b) by 339 days.

(21) Appl. No.: 13/035,216

(22) Filed: Feb. 25, 2011

(65) Prior Publication Data
US 2012/0217080 A1    Aug. 30, 2012

(51) Int. Cl.
  *B60K 1/02*       (2006.01)
  *B60K 7/00*       (2006.01)
  *B60K 17/04*      (2006.01)
  *B60K 17/356*     (2006.01)

(52) U.S. Cl.
  CPC ............ *B60K 1/02* (2013.01); *B60K 7/0007* (2013.01); *B60K 17/046* (2013.01); *B60K 17/356* (2013.01); *B60K 2007/0038* (2013.01); *B60K 2007/0092* (2013.01); *Y10T 29/49826* (2015.01)

(58) Field of Classification Search
  CPC ...... B60K 1/02; B60K 7/0007; B60K 17/356; B60K 2007/0038; B60K 2007/0092
  USPC ............ 180/242, 243, 65.1, 65.6, 65.8, 65.51
  See application file for complete search history.

(56) References Cited

U.S. PATENT DOCUMENTS

| 3,756,335 | A | * | 9/1973 | Eisele et al. ................. 180/6.28 |
| 5,148,883 | A | * | 9/1992 | Tanaka et al. ................. 180/165 |
| 5,465,806 | A | * | 11/1995 | Higasa et al. ................. 180/165 |
| 7,255,185 | B2 | * | 8/2007 | Shimizu ....................... 180/65.1 |
| 7,343,991 | B2 | * | 3/2008 | Rittenhouse .................. 180/9.5 |
| 8,550,632 | B2 | * | 10/2013 | Chapman ...................... 352/243 |
| 8,791,681 | B2 | * | 7/2014 | Akaishi et al. ............... 323/288 |
| 2003/0141129 | A1 | * | 7/2003 | Miguel ......................... 180/242 |
| 2005/0045392 | A1 | * | 3/2005 | Maslov et al. ............... 180/65.5 |
| 2009/0067202 | A1 | * | 3/2009 | Ichikawa et al. ............... 363/79 |
| 2010/0089670 | A1 | * | 4/2010 | Lee et al. ..................... 180/65.8 |

(Continued)

FOREIGN PATENT DOCUMENTS

| DE | 4310001 A1 | 9/1994 |
| DE | 102010017991 A1 | 10/2011 |
| EP | 2199137 A1 | 6/2010 |

(Continued)

OTHER PUBLICATIONS

German Search Report in Counterpart German Application No. 102012202488.3 (5 pages) (Dec. 19, 2012).

(Continued)

*Primary Examiner* — Anne Marie Boehler
(74) *Attorney, Agent, or Firm* — Taft Stettinius & Hollister LLP; Stephen F. Rost

(57) ABSTRACT

The present invention relates to a powered vehicle. The powered vehicle includes a first frame assembly and a second frame assembly. A first axle is coupled to the first frame assembly and a second axle is coupled to the second frame assembly. The powered vehicle further includes a first powertrain assembly and a second powertrain assembly. The first powertrain assembly and second powertrain assembly are interchangeably coupled to the first axle and second axle.

19 Claims, 4 Drawing Sheets

(56) References Cited

U.S. PATENT DOCUMENTS

2010/0116572 A1* 5/2010 Schmitt et al. ............. 180/65.51
2012/0217079 A1* 8/2012 Besler et al. ................. 180/233

FOREIGN PATENT DOCUMENTS

WO      2010043420 A1    4/2010
WO      2010/101032    *    9/2010

OTHER PUBLICATIONS

Wikipedia, Die freie Enzklopadie: Readwechsel [online]. [Retrieved on Dec. 19, 2012.] Retrieved from the internet: <URL http://de.wikipedia.org/w/index.php?title=Spezial: Buch&bookcmd= download&collection_id=e122fb0f8e589e67&writer=rl&return_to=Radwechsel>.

* cited by examiner

POWERED VEHICLE WITH AN INDEPENDENT AND INTERCHANGEABLE POWERTRAIN ASSEMBLY

FIELD OF THE INVENTION

The present invention relates to a powertrain assembly for a powered vehicle, and in particular to a powered vehicle having an independent and interchangeable powertrain assembly.

BACKGROUND OF THE INVENTION

For many vehicle manufacturers, vehicle performance is one of the most important criteria for selling its products to consumers. Along with vehicle performance, the durability and overall life of a vehicle's components is very important. Consumers do not want to drive a vehicle that is constantly breaking down and/or being serviced. Of course, vehicle components naturally begin to wear and require attention through continued use. On many vehicles, tires must be replaced or rotated every several thousands of miles. Likewise, gaskets, shafts, sparkplugs, and other components can break and require replacement.

In a conventional front loader, for example, the vehicle can have a front frame assembly and a rear frame assembly. A front axle is connected to the front frame assembly and a rear axle is connected to the rear assembly. Torque is transferred to each wheel by a drive assembly. The drive assembly includes gears, shafts, bearings, and other components that have a finite life. A motor or engine can provide power to the drive assembly for driving the wheels. Therefore, after the drive assembly and motor, for example, have operated for a number of hours and miles, the internal components of each begin to wear and can potentially fail. Service plans and the like are established to replace or service a component before it negatively impacts vehicle performance.

The ability to perform service on the different components that are connected to an axle can be difficult. For example, it can be cumbersome to remove an entire axle from the vehicle. In most instances, the front axle is different from the rear axle. In addition, each axle can be packaged differently (e.g., with different components) and each axle can mount differently to its respective frame assembly. The front axle of a conventional front loader, for example, can be fixed to the front frame assembly, whereas the rear axle oscillates with respect to the rear axle. This difference can require different connections and steps for removing and servicing the front axle compared to the rear axle. Due to the differences in the front and rear axles, the motors, drive assemblies, gear sets, etc. that mount to the front axle can be substantially different from those that mount to the rear axle.

In addition, the components may wear differently depending on the vehicle application and where on the vehicle each component is located. For instance, if a vehicle makes left turns 75% of the time, those components on the leftside of the vehicle can wear more quickly and thus have less durability than those components on the rightside of the vehicle. In other instances, the components coupled to the front axle can wear more quickly than the components coupled to the rear axle. Thus, the vehicle service plan can require the front axle to be serviced after fewer miles or hours of operation than the rear axle. This can increase the amount of vehicle downtime and therefore reduce overall vehicle productivity.

Thus, a need exists for an improving the durability and overall life of a vehicle powertrain assembly. A further need is to simplify the manner in which the powertrain is serviced to improve vehicle productivity.

SUMMARY

In one exemplary embodiment of the present disclosure, a powered vehicle includes a first frame assembly and a second frame assembly. A first axle is coupled to the first frame assembly and a second axle is coupled to the second frame assembly. The vehicle also includes a first powertrain assembly and a second powertrain assembly. The first powertrain assembly and second powertrain assembly are interchangeably coupled to the first axle and second axle.

In one aspect, the first powertrain assembly comprises a first motor and the second powertrain assembly comprises a second motor. The first motor and second motor are independent from one another and interchangeably coupled to the first axle or second axle. The vehicle can further include a first inverter and a second inverter. The first inverter is electrically coupled to the first motor and removably coupled to a first circuit in the vehicle. The second inverter is electrically coupled to the second motor and removably coupled to a second circuit in the vehicle. When the first motor is removed from the first axle and coupled to the second axle and the second motor is removed from the second axle and coupled to the first axle, the first inverter is removed from the first circuit and coupled to the second circuit and the second inverter is removed from the second circuit and coupled to the first circuit.

In another aspect, the first powertrain assembly includes a first drive assembly and the second powertrain assembly includes a second drive assembly. The first drive assembly and second drive assembly are independent and interchangeable with one another. The vehicle can further include a first motor and a second motor. The first motor is removably coupled to the first drive assembly and the second motor is removably coupled to the second drive assembly. As such, the first motor and second motor are interchangeably coupled to the first axle and second axle and the first drive assembly and second drive assembly are interchangeably coupled to the first axle and second axle. In addition, the vehicle can include a first inverter and a second inverter. The first inverter is electrically coupled to the first motor and removably coupled to a first circuit in the vehicle and the second inverter is electrically coupled to the second motor and removably coupled to a second circuit in the vehicle. In this aspect, when the first motor is removed from the first axle and coupled to the second axle and the second motor is removed from the second axle and coupled to the first axle, the first inverter is removed from the first circuit and coupled to the second circuit and the second inverter is removed from the second circuit and coupled to the first circuit.

In a different aspect, the first axle is a front axle and the second axle is a rear axle. Alternatively, the first axle is disposed on a left side of the vehicle and the second axle is disposed on a right side of the vehicle.

In a different embodiment, a method is provided for improving the durability of a powertrain assembly in a powered vehicle. The vehicle includes at least a first axle and a second axle and the powertrain assembly including a first powertrain and a second powertrain. The method includes removing the first powertrain from the first axle and the second powertrain from the second axle. The method further includes coupling the first powertrain to the second axle and the second powertrain to the first axle.

In one aspect, a motor or drive assembly of the first and/or second powertrain is removed from the vehicle. In a different aspect, the method includes interchangeably coupling the first powertrain to the first axle or second axle and interchangeably coupling the second powertrain to the first axle or second axle. In another aspect, the method includes monitoring a vehicle characteristic and comparing the vehicle characteristic to a threshold. After the vehicle characteristic exceeds the threshold, the first powertrain is removed from the first axle and coupled to the second axle and the second powertrain is removed from the second axle and coupled to the first axle. The vehicle characteristic can be hours of operation or miles. The method can also include switching a first inverter from a first circuit to a second circuit and switching a second inverter from the second circuit to the first circuit.

In another embodiment, a vehicle system includes a monitoring system for monitoring a vehicle characteristic, a first axle configured to power a first wheel, and a second axle configured to power a second wheel. The vehicle also includes a first powertrain system including a first motor, a first inverter, and a first drive assembly. The first motor is coupled to the first drive assembly and the first motor is electrically coupled to the first inverter. The vehicle further includes a second powertrain system including a second motor, a second inverter, and a second drive assembly. The second motor is coupled to the second drive assembly and the second motor is electrically coupled to the second inverter. The first motor is substantially the same as the second motor and the first drive assembly is substantially the same as the second drive assembly such that the first powertrain system and second powertrain system are interchangeably coupled to the first axle and second axle.

In one aspect, the first powertrain system is interchangeably coupled to one of the first axle or second axle in response to the vehicle characteristic monitored by the monitoring system. In another aspect, the second powertrain system is interchangeably coupled to one of the first axle or second axle in response to the vehicle characteristic monitored by the monitoring system. Alternatively, the first inverter and second inverter are interchangeably coupled to a first circuit and a second circuit in the vehicle system in response to the vehicle characteristic monitored by the monitoring system.

One advantage of the above-described embodiments is the ability to improve the durability and overall life the vehicle and its working components. Unlike conventional vehicles, these embodiments include motors, drive assemblies, and inverters that can be rotated from a front axle to a rear axle and vice versa. Alternatively, these components can be rotated from the left side of the vehicle to the right side of the vehicle and vice versa. This can be done after a predetermined number of miles or hours of operation has elapsed to reduce the wear on the components. Each of the components is independent and interchangeable with one another.

In addition, each powertrain assembly can include a motor, for example, that has one or more cast ramp on the bottom of its housing to simplify the assembly of the motor to an axle. The axle can include an axle housing to which the motor couples, and the cast ramp can slide along the interior of the housing to ease the assembly. This also simplifies the assembly and serviceability of the powertrain assembly because the motor or drive assembly can be serviced without removing an entire axle.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
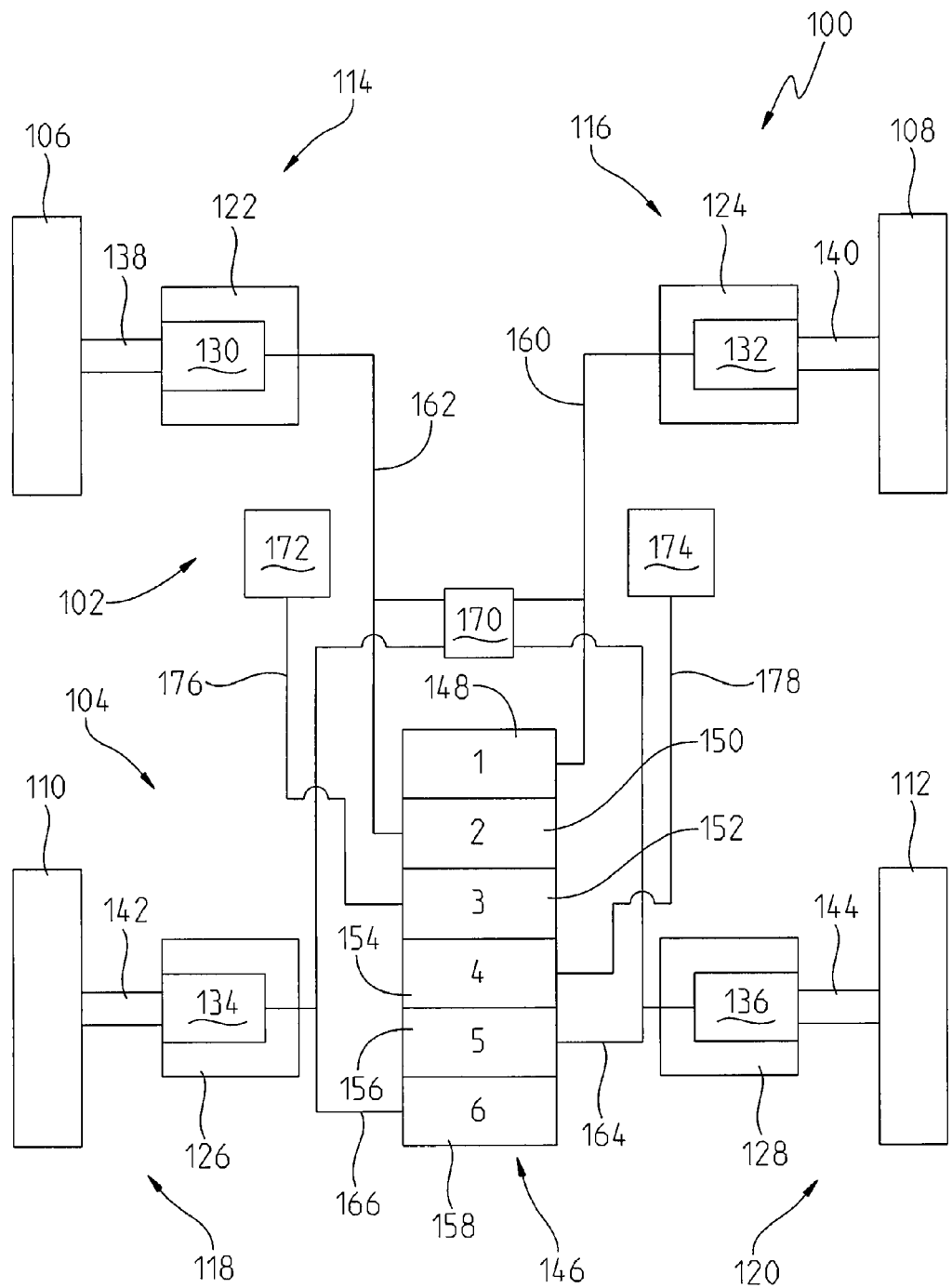
FIG. 1 is a schematic of a vehicle having independently powered wheels.

Referring to FIG. 1, an exemplary embodiment of a vehicle 100 is shown. The vehicle 100 includes a controller 170 and a plurality of independently powered wheels. The controller 170 can include a display configured to display a vehicle characteristic (e.g., mileage, time, etc.) in a cab of the vehicle. The function of the monitoring system is further described below. In FIG. 1, however, the vehicle has a front 102 and a rear 104. The front 102 can include two front wheels 106, 108 and the rear 104 can include two rear wheels 110, 112. In FIG. 1, the front wheel 106 and rear wheel 110 are coupled to the left side of the vehicle 100, whereas the front wheel 108 and rear wheel 112 are coupled to the right side of the vehicle 100.

Each wheel is coupled to an axle assembly which produces and transfers power to the wheel. In this embodiment, there is a first axle 114 for driving the front wheel 106, a second axle 116 for driving the other front wheel 108, a third axle 118 for driving the rear wheel 110, and a fourth axle for driving the other rear wheel 112. As will be explained below, each axle includes an axle tube housing and flange for coupling to a power-producing apparatus. The power-producing device can be an engine, a motor, a battery, or any other similar device. If the power-producing apparatus is an engine, the engine can be diesel, hydraulic, pneumatic, or any other known engine. Alternatively, if the power-producing apparatus is a motor, the motor can be electric, hydraulic, or any other known motor. In one non-limiting example, the motor can be a switch reluctance motor. Alternatively, the motor can be a permanent magnet motor as well.

In this embodiment, each axle includes an electric motor for providing power to each wheel. For instance, the first axle 114 includes an axle housing 122, a motor 130, and a drive assembly 138. The motor 130 is coupled to a drive assembly 138 such that power is produced by the motor 130 and transferred to the drive assembly 138. The drive assembly 138 can include different gear sets, clutch assemblies, shafts, bearings, etc. for transferring the power produced by the motor 130 to the front wheel 106. The drive assembly 138 can be controlled to produce a different gear ratio depending on driving conditions and applications. The motor 130 is electrically coupled to a bank of inverters 146. The bank, or cabinet, of inverters 146 is disposed near the rear 104 of the vehicle 100. The bank of inverters 146 includes a plurality of inverters. Each motor in the vehicle includes an independent inverter. The first motor 130, for example, is electrically coupled to an inverter 150.

In the illustrated embodiment of FIG. 1, the bank of inverters 146 includes six inverters (i.e., inverters 148, 150, 152, 154, 156, and 158). As noted, the vehicle 100 includes four axles 114, 116, 118, and 120 to which an independent motor 130, 132, 134, and 136 is coupled thereto. The first motor 130 is electrically coupled to the inverter 150 by a circuit 162. As shown in FIG. 1, the inverters are each disposed in a corresponding slot or location in the bank of inverters 146. Inverter 150, for example, is disposed in slot or location 2. Inverter 148 is disposed in slot or location 1. Similarly, inverter 152 is disposed in slot or location 3, inverter 154 is disposed in slot or location 4, inverter 156 is disposed in slot or location 5, and inverter 158 is disposed in slot or location 6. In this embodiment, the vehicle 100 includes four motors and six inverters. The extra two inverters, i.e., inverters 152 and 154, are electrically coupled to a pair of generators 172, 174, respectively, along circuits 176 and 178 in the vehicle.

The generators 172, 174 can transfer mechanical engine power into electrical power and each generator inverter controls how much load each generator puts on the engine. It is desirable to keep the "bus" at a constant required voltage. The motor inverters then control the motors, which transfer this electrical energy back into mechanical. In other words, each motor depletes the "bus" whereas each generator recharges it. In this embodiment, the generators 172, 174 are driven by a generator/pump drive (not shown) which is coupled to the engine. One generator 172 drives the second motor 132 and third motor 134 and the other generator 174 drives the first motor 130 and fourth motor 136. In other embodiments, the generators can control any one of the motors.

As described above, the vehicle 100 includes a second axle 116 having an axle housing 124 and a second motor 132 which is coupled to a second drive assembly 140. The second drive assembly 140 is coupled to and provides power to drive the front wheel 108. The second motor 132 is electrically coupled to inverter 148 via circuit 160. The circuit 160 can include wires and other electric components for operating the motor 132.

The third axle 118 also includes an axle housing 126 and a third motor 134 which is coupled to a third drive assembly 142. The third drive assembly 142 is coupled to and provides power to the rear wheel 110. The third motor 134 is electrically coupled to the inverter 158 via a circuit 166. Similarly, the fourth axle 120 can include an axle housing 128 and a fourth motor 136 which is coupled to a fourth drive assembly 144. The fourth drive assembly 144 is coupled to and provides power to the rear wheel 112. The fourth motor 136 is electrically coupled to the inverter 156 via a circuit 164.

Figure 2:
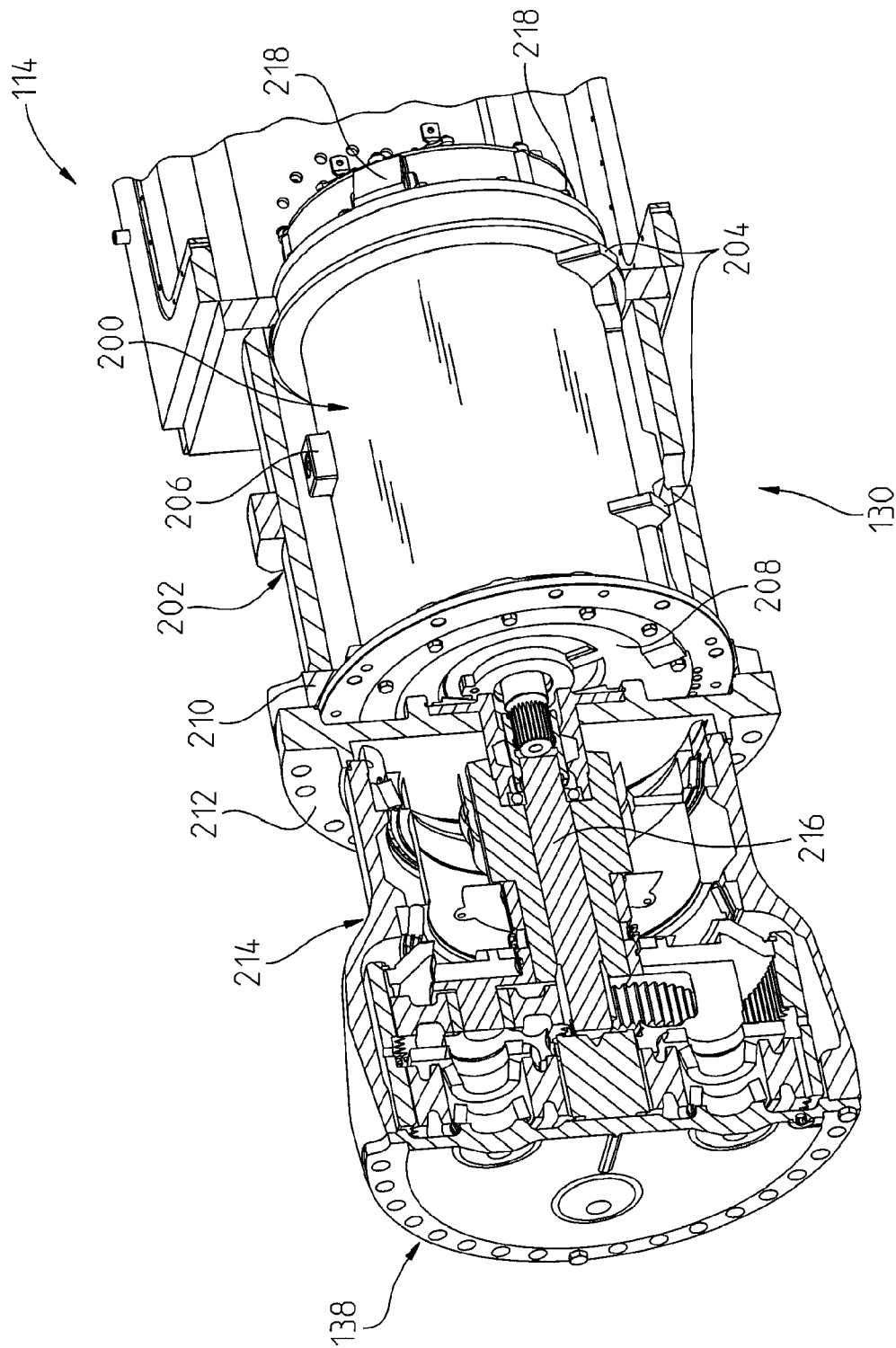
FIG. 2 is a partial perspective view of a powertrain assembly.

Referring to FIG. 2, a portion of the first axle 114 is shown. The second axle 116, third axle 118, and fourth axle 120 can be substantially the same as the first axle 114, particularly with respect to the type of motor and drive assembly. Also similar is the manner by which the motor and drive assembly are coupled to the axle. In this embodiment, the axle 114 can include an axle tube housing 202. As shown in FIG. 2, the axle tube housing 202 includes a hollow portion into which the motor 130 fits. The axle tube housing 202 in FIG. 2 is the same as the axle tube housing 122 in FIG. 1.

The motor 130 includes a motor housing 200, a plurality of hoist connections 206, a plurality of cast feet 204, and a plurality of cast ramps 218. The design of the motor housing 200 is advantageous over conventional motor housings because the manner in which the motor 130 is coupled to the axle is simplified. In many conventional motors, the housing is substantially round and cannot be easily guided into connection with the axle. Therefore, to connect a conventional motor housing to an axle tube housing, for example, a counterweight was required on the side of the motor opposite the axle tube housing to balance the weight. Otherwise, the hoist or other tool used to connect the motor to the axle would be unable to make the connection. Alternatively, a specially designed hoist or tool would be required to connect the motor to the axle. In some instances, a conventional drive assembly is first connected to the conventional motor before the assembly could be connected to the axle. This often increases the amount of time for assembling and disassembling the axle. In some conventional axles, the entire axle has to be dropped to make a repair to the conventional motor or drive assembly.

Many of these disadvantages with conventional motors are overcome by the motor housing 200. The plurality of cast feet 204 and cast ramps 218 allow the motor housing 200 to slide inside the axle tube housing 202 to simplify assembly and disassembly. The plurality of cast feet 204 is disposed along the bottom side of the motor housing 200 from the front to the rear of the housing 200. The plurality of cast ramps 218 are configured at an angle near the front of the motor 130 to achieve a simpler connection to the axle tube housing 202. In addition, dowel pins (not shown) or the like can be used to align the motor housing 200 with the axle tube housing 202 during assembly. The motor housing 200 includes slots or openings (not shown) through which dowel pins can be inserted for alignment.

In FIG. 2, the axle tube housing 202 also includes a flange 210 integrally coupled thereto. The axle tube flange 210 can be coupled to a drive spindle 212, which is coupled to the drive assembly 138. In particular, the drive assembly 138 includes a drive housing 214 for coupling to the spindle 212. When assembling the motor housing 200 and drive housing 214 to the axle 114, a motor plate 208 is first coupled to the motor housing 200 via a plurality of fasteners. As described above, dowel pins or the like can be used for aligning the motor housing 200 with the axle tube housing 202. The motor housing 200 and motor plate 208 are then coupled to the axle tube housing 202.

Once the motor 130 is coupled to the axle 114, the drive assembly 138 can be coupled to the motor 130. To do so, the spindle 212 is coupled to the axle tube flange 210. Although not shown, the spindle 212 can include a small groove or notch which engages a seal or o-ring disposed along the diameter of the motor plate 208. The motor plate 208 can locate the seal such that when the spindle 212 is coupled to the flange 210, a face seal is formed therebetween. In addition, the motor plate 208 can help pilot the spindle 212 to the motor 130 to minimize misalignment therebetween. Once the spindle 212 is coupled to the flange 210, the drive housing 214 can be coupled to the spindle 214.

This layout/configuration allows for better serviceability of the vehicle. For instance, if the drive assembly 138 needs repaired, the drive assembly 138 can be disengaged from the motor 130 without having to either drop the entire axle 114 from the vehicle or remove the motor 130 in addition to the drive assembly 138. Thus, the manner in which the motor 130 and drive assembly 138 can be coupled to the axle 114 allows for improved serviceability and better overall vehicle productivity (due to less downtime).

Another advantage of the previously described embodiments is the interchangeability of the motors, drive assemblies, and inverters. A vehicle may include different axles and connections thereto, particularly when the vehicle includes a fixed, front frame and an oscillating, rear frame. However, in the previously described embodiments, the motors and drive assemblies are independent from one another but are substantially the same. As such, any one of the motors can be coupled to any one of the axles. Likewise, any one of the drive assemblies can be coupled to any one of the axles.

In many conventional vehicles, the components disposed near the front of the vehicle can be exposed to greater loads, torques, or speeds and therefore wear more quickly than those disposed near the rear. Also, depending on vehicle application, some vehicles may turn to the left or right more than in the other direction. As such, additional load or torque can cause components to wear more quickly on a particular side of the vehicle. In most conventional vehicles, however, axles, motors, drive assemblies, etc. are different from one another and especially from the front side of the vehicle compared to the rear. For example, axles can have different ratios and the like and thus require a certain motor or drive assembly due to the connections thereto.

Figure 3:
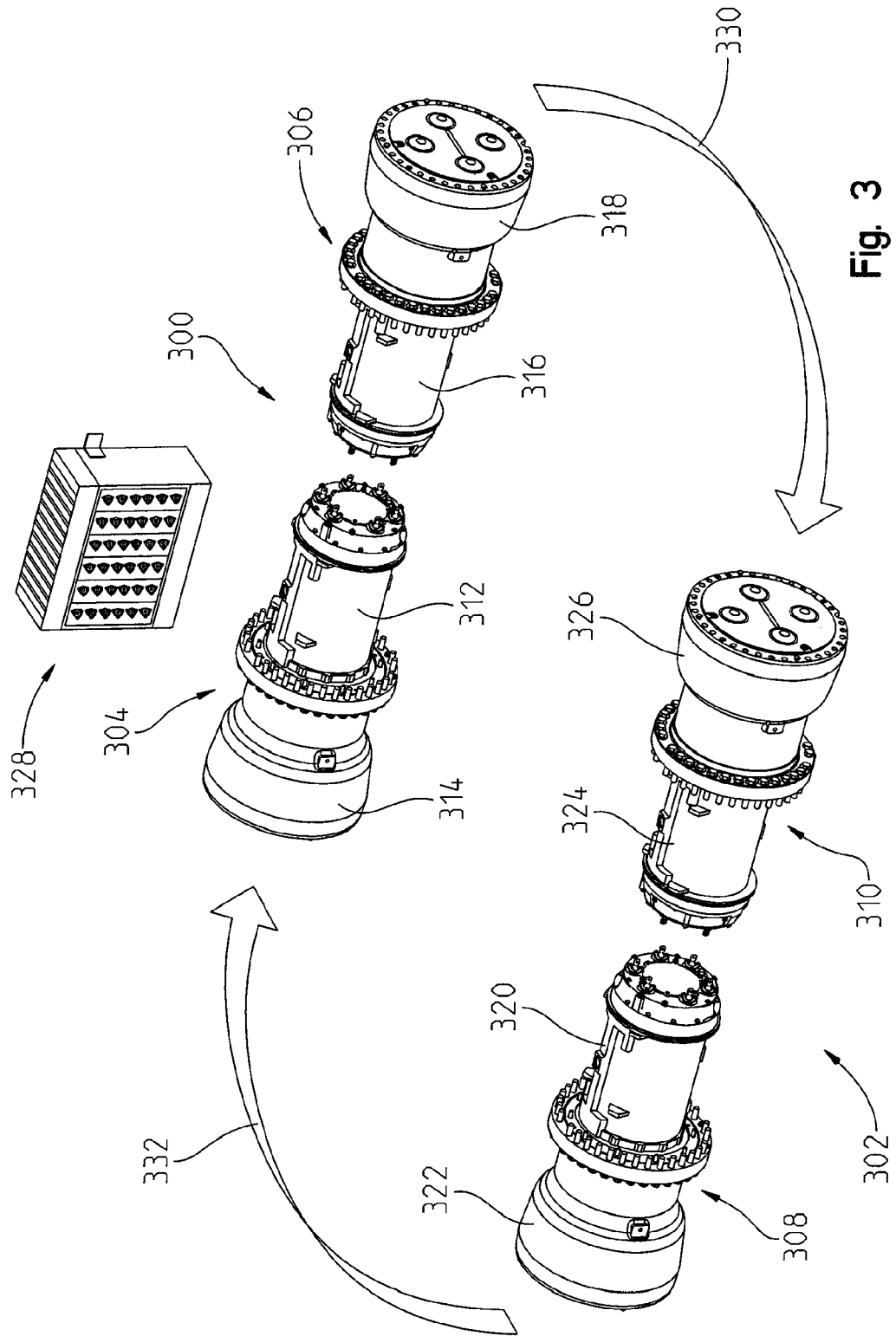
FIG. 3 is a schematic of a vehicle having independent and interchangeable powertrain assemblies.

In the embodiment shown in FIG. 3, however, a vehicle can have a front 300 and rear 302. The front 300 can include a first axle 304 and a second axle 306. Likewise, the rear 302 can include a third axle 308 and fourth axle 310. The first axle 304 can include a first motor 312 and a first drive assembly 314 coupled thereto. The second axle 306 can include a second motor 316 and a second drive assembly 318 coupled thereto. Similarly, the third axle 308 can include a third motor 320 and a third drive assembly 322 coupled thereto. Lastly, the fourth axle 310 can include a fourth motor 324 and a fourth drive assembly 326. The vehicle can further include a bank of inverters 328 similar to that described above with reference to FIG. 1.

The first motor 312, second motor 316, third motor 320, and fourth motor 324 are each independent from one another. However, each is substantially the same and therefore interchangeable with each other. For instance, the first motor 312 and second motor 316 can be rotated from the front 300 of the vehicle to the rear 302 (indicated by arrow 330). Likewise, the third motor 320 and fourth motor 324 can be rotated from the rear 302 of the vehicle to the front 300 (indicated by arrow 332). Advantageously, it does not matter to which axle the motors are coupled to. For example, after the rotation, the first motor 312 can be coupled to either the third axle 308 or fourth axle 310. The second motor 316 can also be coupled to the third axle 308 or fourth axle 310. Similarly, the third motor 320 and fourth motor 324 can be coupled to either the first axle 304 or second axle 306.

In the above example, the motors can be rotated and coupled to any of the drive assemblies of each axle. However, it is also possible to rotate the drive assemblies to different axles. The first drive assembly 314 and second drive assembly 318 can be rotated from the front 300 to the rear 302 and coupled to the third axle 308 or fourth axle 310. Likewise, the third drive assembly 322 and fourth drive assembly 326 can be rotated from the rear 302 of the vehicle to the front 300 can coupled to the first axle 304 or second axle 306.

In both of the previous examples, either the motor or drive assembly was rotated. However, it is further possible to rotate both the first motor 312 and first drive assembly 314 from the first axle 304 to the second axle 306, third axle 308, or fourth axle 310. Similarly, the second motor 316 and second drive assembly 318 can both be rotated to the first axle 304, third axle 308, or fourth axle 310. The same can be true for the third motor 320 and third drive assembly 322 and the fourth motor 324 and fourth drive assembly 326.

Figure 4:
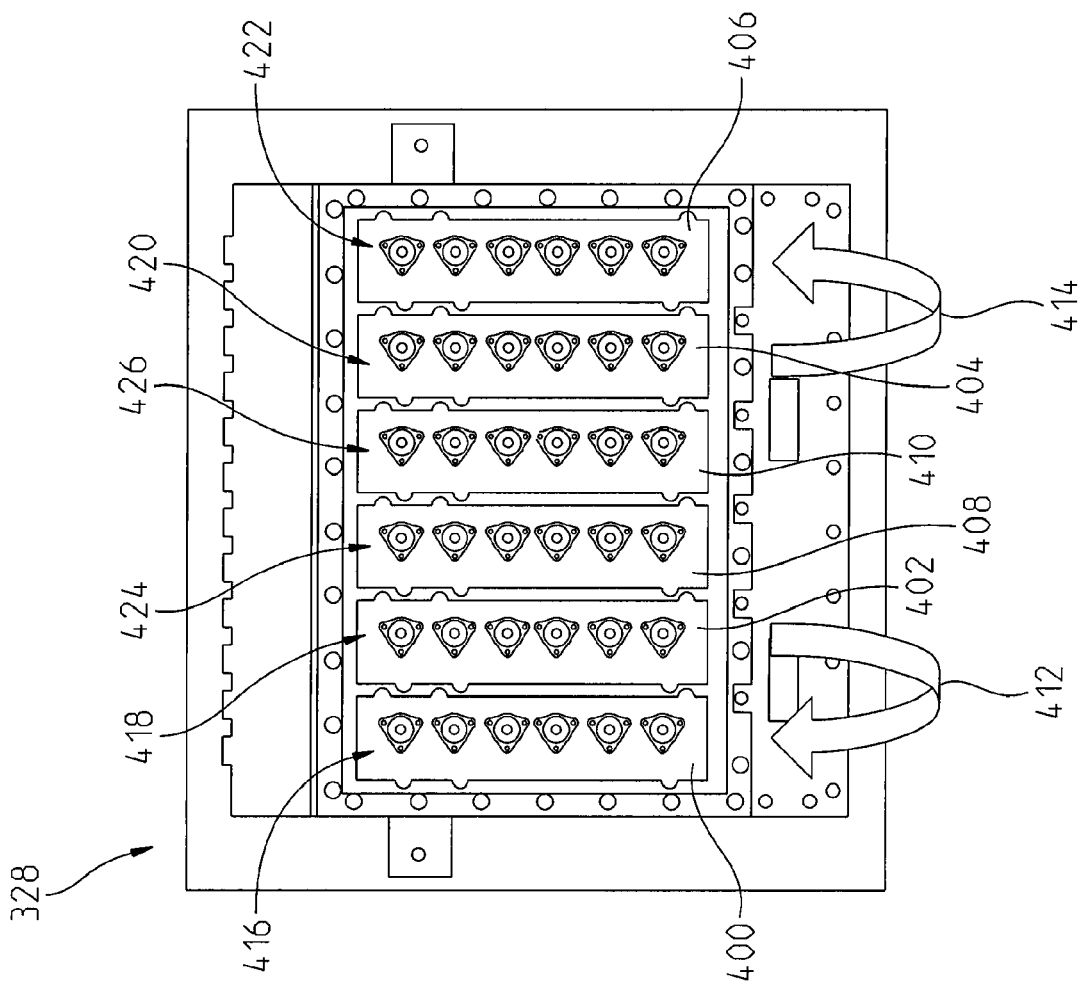
FIG. 4 is a schematic of a bank of inverters for coupling to powertrain assemblies of FIG. 3.

Referring also to FIG. 4, the inverters in the inverter bank 328 can also be rotated whenever one of the motors to which the inverter is electrically coupled is rotated. For example, the motors at the front of a vehicle may wear more quickly than the motors at the rear of the vehicle due to increased loads. Since each inverter controls the amount of speed and torque that is produced by each motor, the inverters can be exposed to loads as well. In particular, the inverters that control the motors at the front of a vehicle may be subjected to greater loads than the inverters that control the motors at the rear of the vehicle. Therefore, when a motor is rotated from front to rear, it can be advantageous to the overall life of the inverter to be rotated as well. This, however, does not mean that the inverter must always be coupled to the same motor. Instead, any inverter can function with any motor, but improved durability and overall life of the inverter can be achieved by rotating inverters.

In the exemplary embodiment shown in FIG. 4, the inverter bank 328 can include a plurality of circuits to which an inverter is electrically coupled. In FIG. 4, for example, the bank 328 includes a first circuit 416, a second circuit 418, a third circuit 420, a fourth circuit 422, a fifth circuit 424, and a sixth circuit 426. In this example, a first inverter 400 is coupled to the first circuit 416 and further electrically couples to the first motor 312 (see FIG. 3). A second inverter 402 is coupled to the second circuit 418 and is electrically coupled to the second motor 316. A third inverter 404 is coupled to the third circuit 420 and is electrically coupled to the third motor 320. Likewise, a fourth inverter 406 is coupled to the fourth circuit 420 and is electrically coupled to the fourth motor 324. The bank 328 can also include a fifth inverter 408 and a sixth inverter 410 which are coupled to the fifth circuit 424 and sixth circuit 426, respectively, and are electrically coupled to a pair of generators (not shown). The generators can also be rotated, but there are fewer advantages to doing so unless a vehicle is more loaded at one corner thereof.

Each inverter can be rotated whenever the motor to which it is electrically coupled is rotated. Thus, if the first motor 312 is rotated with the second motor 316 such that the first motor 312 is coupled to the second axle 306 and the second motor 316 is coupled to the first axle 304, the first inverter 400 is removed from the first circuit 416 and coupled to the second circuit 418. Likewise, the second inverter 402 is removed from the second circuit 418 and coupled to the first circuit 416. The rotation or switching of inverters is indicated by arrow 412. In addition, if the third motor 320 is rotated to the fourth axle 310 and the fourth motor 324 is rotated to the third axle 308, the third inverter 404 is rotated to the fourth circuit 422 and the fourth inverter 406 is rotated to the third circuit 420. This rotation is indicated by arrow 414. Therefore, each inverter remains with its corresponding motor after each rotation.

The present disclosure further contemplates a monitoring system in a vehicle. The monitoring system, similar to the controller 170 in FIG. 1, can be an odometer, for example, that monitors vehicle mileage. Alternatively, the monitoring system can be an internal clock that monitors the amount of time a vehicle is in operation. Other systems can be used to monitor duty cycles, e.g., any time a vehicle completes a type of shift. Another system can monitor the torque load on a front or rear frame. Alternatively, a system can monitor vehicle speed, the ratio of left turns to right turns, etc. The monitoring system can include a display on a vehicle dashboard, for example, in which mileage, time, etc. is displayed. Therefore, after a vehicle has surpassed a threshold (e.g., 5,000 miles), the monitoring system can alert the vehicle operator. The vehicle can be serviced by rotating the motors, inverters, and/or drive assemblies from the front to the rear and vice versa. Alternatively, the motors, inverters, and/or drive assemblies can be rotated from the left to the right of the vehicle and vice versa.

Test results of rotating components can improve the durability of these components by up to 50%. In one example, a drive assembly required a rebuild after 18,000 hours of operation. However, a different drive assembly was rotated after a certain number of hours of operation and this drive assembly did not require a rebuild until almost 27,000 hours. The gears and bearings of the drive assembly showed an increase in durability and overall life due to the rotation. The ability to monitor mileage or hours of operation, for example, can trigger the timing for rotation of components.

The embodiments described above refer to vehicles that include four axles. However, the present disclosure is intended for vehicles having fewer or more than four axles.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A powered vehicle, comprising:
   a first frame assembly and a second frame assembly;
   a first axle coupled to the first frame assembly, the first axle including a first axle tube housing;
   a second axle coupled to the second frame assembly, the second axle including a second axle tube housing;
   a first independently powered wheel coupled to the first axle and a second independently powered wheel coupled to the second axle;
   a first powertrain assembly including:
      a first drive assembly including a first drive housing and a first drive spindle;
      a first motor including a first motor housing, the first motor housing having a plurality of feet and ramps disposed along its outer surface configured to assist with a sliding engagement between the first motor housing and either the first axle tube housing or the second axle tube housing; and
      a first motor plate coupled to the first motor housing and either the first axle tube housing or the second axle tube housing; and
   a second powertrain assembly including:
      a second drive assembly including a second drive housing and a second drive spindle;
      a second motor including a second motor housing, the second motor housing having a plurality of feet and ramps disposed along its outer surface configured to assist with a sliding engagement between the second motor housing and either the first axle tube housing or the second axle tube housing; and
      a second motor plate coupled to the second motor housing and either the first axle tube housing or the second axle tube housing;
   wherein, the first powertrain assembly and the second powertrain assembly are interchangeable with one another such that either may be coupled to the first axle or second axle;
   further wherein, when either the first powertrain assembly or the second powertrain assembly is coupled to one of the axles, the respective motor is disposed within a hollow portion of the first or second axle tube housing, the respective drive spindle is coupled to the first or second axle tube housing, and the respective motor plate is disposed between the respective drive assembly and respective first motor.

2. The powered vehicle of claim 1, further comprising:
   a first electrical circuit and a second electrical circuit;
   a first inverter electrically coupled to the first motor; and
   a second inverter electrically coupled to the second motor;
   wherein, the first inverter and the second inverter are interchangeable with one another such that either may be coupled to the first circuit or second circuit.

3. The powered vehicle of claim 1, further comprising:
   a plurality of inverters including at least a first inverter, a second inverter, a third inverter, and a fourth inverter, where the first inverter is electrically coupled to the first motor and the second inverter is electrically coupled to the second motor;
   a first generator electrically coupled to the third inverter; and
   a second generator electrically coupled to the fourth inverter;
   wherein, the first generator and second generator are configured to convert mechanical power from a power-producing apparatus into electrical power to electrically power the first and second motors.

4. The powered vehicle of claim 3, wherein the first generator and second generator are interchangeable with one another such that either may be coupled to the third inverter or the fourth inverter.

5. The powered vehicle of claim 1, further comprising:
   a third axle including a third axle tube housing;
   a fourth axle including a fourth axle tube housing;
   a third powertrain assembly including:
      a third drive assembly including a third drive housing and a third drive spindle;
      a third motor including a third motor housing, the third motor housing having a plurality of feet and ramps disposed along its outer surface configured to assist with a sliding engagement between the third motor housing and either the third axle tube housing or the fourth axle tube housing; and
      a third motor plate coupled to the motor housing and either the third axle tube housing or the fourth axle tube housing; and
   a fourth powertrain assembly including:
      a fourth drive assembly including a fourth drive housing and a fourth drive spindle;
      a fourth motor including a fourth motor housing, the fourth motor housing having a plurality of feet and ramps disposed along its outer surface configured to assist with a sliding engagement between the fourth motor housing and either the third axle tube housing or the fourth axle tube housing; and
      a fourth motor plate coupled to the motor housing and either the third axle tube housing or the fourth axle tube housing;
   wherein, the third powertrain assembly and the fourth powertrain assembly are interchangeable with one another such that either may be coupled to the third axle or fourth axle.

6. The powered vehicle of claim 5, wherein the first powertrain assembly, the second powertrain assembly, the third powertrain assembly, and the fourth powertrain assembly are interchangeable with one another such that any one of the powertrain assemblies can be coupled to any one of the axles.

7. The powered vehicle of claim 5, further comprising:
a plurality of inverters including at least a first inverter, a second inverter, a third inverter, a fourth inverter, a fifth inverter, and a sixth inverter;
a first generator electrically coupled to the fifth inverter; and
a second generator electrically coupled to the sixth inverter;
wherein, the first inverter is electrically coupled to the first motor, the second inverter is electrically coupled to the second motor, the third inverter is electrically coupled to the third motor, and the fourth inverter is electrically coupled to the fourth motor.

8. The powered vehicle of claim 7, wherein the first generator is electrically coupled to the first and second motors and the second generator is electrically coupled to the third and fourth motors, where the first and second generators are configured to convert mechanical power from a power-producing apparatus into electrical power to electrically power each of the motors.

9. The powered vehicle of claim 7, further comprising a plurality of circuits including at least a first circuit, a second circuit, a third circuit, and a fourth circuit;
wherein the first inverter, the second inverter, the third inverter, and the fourth inverter are interchangeable with one another, and each is independently coupled to one of the first circuit, the second circuit, the third circuit, and the fourth circuit.

10. A powered vehicle, comprising:
a first frame assembly and a second frame assembly;
a first axle coupled to the first frame assembly;
a second axle coupled to the second frame assembly;
a first independently powered wheel coupled to the first axle and a second independently powered wheel coupled to the second axle;
a first powertrain assembly including a first drive assembly and a first motor;
a second powertrain assembly including a second drive assembly and a second motor;
a plurality of inverters including at least a first inverter, a second inverter, a third inverter, and a fourth inverter;
a plurality of electrical circuits including at least a first circuit, a second circuit, a third circuit, and a fourth circuit;
a first generator electrically coupled to the third inverter and a second generator electrically coupled to the fourth inverter, where the first generator and second generator are configured to convert mechanical power from a power-producing apparatus into electrical power to electrically power at least the first motor and the second motor;
wherein, the first inverter is electrically coupled to the first circuit and the first motor, the second inverter is electrically coupled to the second circuit and the second motor, the third inverter is electrically coupled to the third first generator, and the fourth inverter is electrically coupled to the second generator;
further wherein, the first powertrain assembly and the second powertrain assembly are interchangeable with one another such that either may be coupled to the first axle or second axle, and the first inverter and the second inverter are interchangeable with one another such that either may be coupled to the first circuit or second circuit;
further wherein each of the first powertrain assembly and the second powertrain assembly comprise a drive housing, a drive spindle, a first motor housing having a plurality of feet and ramps disposed along its outer surface configured to assist with a sliding engagement between the motor housing and either the first axle or the second axle, and a motor plate coupled to the motor housing and either the first axle or the second axle.

11. The powered vehicle of claim 10, wherein:
the first generator and second generator are interchangeable with one another such that either may be coupled to the third inverter or the fourth inverter; and
the third inverter and the fourth inverter are interchangeable with one another such that either may be coupled to the third circuit or the fourth circuit.

12. The powered vehicle of claim 10, further comprising:
a third axle coupled to the first frame assembly;
a fourth axle coupled to the second frame assembly;
a third independently powered wheel coupled to the third axle and a fourth independently powered wheel coupled to the fourth axle;
a third powertrain assembly including a third drive assembly and a third motor; and
a fourth powertrain assembly including a fourth drive assembly and a fourth motor;
wherein, the third powertrain assembly and the fourth powertrain assembly are interchangeable with one another such that either may be coupled to the third axle or the fourth axle.

13. The powered vehicle of claim 12, wherein:
the plurality of inverters includes a fifth inverter and a sixth inverter;
the plurality of circuits includes a fifth circuit and a sixth circuit;
further wherein, the fifth inverter is electrically coupled to the third motor and the sixth inverter is electrically coupled to the fourth motor.

14. The powered vehicle of claim 13, wherein the fifth inverter and the sixth inverter are interchangeable with one another such that either may be coupled to the fifth circuit or the sixth circuit.

15. The powered vehicle of claim 13, wherein the first inverter, the second inverter, the fifth inverter, and the sixth inverter are interchangeable with one another, and each is independently coupled to one of the first circuit, the second circuit, the fifth circuit, and the sixth circuit.

16. The powered vehicle of claim 10, wherein the first generator is electrically coupled to the first and second motors and the second generator is electrically coupled to the third and fourth motors, where the first and second generators are configured to convert mechanical power from a power-producing apparatus into electrical power to electrically power each of the motors.

17. A vehicle system, comprising:
a controller;
a first axle and a second axle, the first and second axles each including an axle tube housing;
a first independently powered wheel coupled to the first axle and a second independently powered wheel coupled to the second axle;
a first powertrain assembly and a second powertrain assembly, where each powertrain assembly comprises:
a drive assembly including a drive housing;
a motor including a motor housing, the motor housing having a plurality of feet and ramps disposed along its outer surface configured to assist with a sliding engagement between the motor housing and the axle tube housing of either the first axle or the second axle; and a motor plate coupled to the motor housing and the axle tube housing of either the first axle or the second axle;

a plurality of inverters including at least a first inverter, a second inverter, a third inverter, and a fourth inverter;

a plurality of electrical circuits including at least a first circuit, a second circuit, a third circuit, and a fourth circuit; and a first generator electrically coupled to the third circuit and a second generator electrically coupled to the fourth circuit, where the first generator and second generator are configured to convert mechanical power from a power-producing apparatus into electrical power to electrically power at least the motors of the first and second powertrain assemblies;

wherein, the first inverter is electrically coupled to the motor of the first powertrain assembly, the second inverter is electrically coupled to the motor of the second powertrain assembly, the third inverter is electrically coupled to the first generator, and the fourth inverter is electrically coupled to the second generator;

further wherein, the first powertrain assembly and the second powertrain assembly are interchangeable with one another such that either may be coupled to the first axle or second axle, and the first inverter and the second inverter are interchangeable with one another such that either may be coupled to the first circuit or the second circuit.

18. The vehicle system of claim 17, further comprising:
a third axle and a fourth axle, the third and fourth axles each including an axle tube housing;

a third independently powered wheel coupled to the third axle and a fourth independently powered wheel coupled to the second axle;

a third powertrain assembly including a third drive assembly and a third motor;

a fourth powertrain assembly including a fourth drive assembly and a fourth motor;

a fifth inverter and a sixth inverter of the plurality of inverters;

a fifth circuit and a sixth circuit of the plurality of circuits;

wherein, the fifth inverter is electrically coupled to the third motor and the sixth inverter is electrically coupled to the fourth motor;

further wherein, the fifth inverter and the sixth inverter are interchangeable with one another such that either may be coupled to the fifth circuit or the sixth circuit.

19. The vehicle system of claim 18, wherein:
the first powertrain assembly, the second powertrain assembly, the third powertrain assembly, and the fourth powertrain assembly are interchangeable with one another, and each is independently coupled to one of the first axle, the second axle, the third axle, and the fourth axle; and the first inverter, the second inverter, the fifth inverter, and the sixth inverter are interchangeable with one another, and each is independently coupled to one of the first circuit, the second circuit, the fifth circuit, and the sixth circuit.

* * * * *